US007462015B2

(12) United States Patent
Mazet et al.

(10) Patent No.: US 7,462,015 B2
(45) Date of Patent: Dec. 9, 2008

(54) ROTOCRAFT ROTOR WITH HINGED BLADES AND LOCKABLE RETRACTABLE FLAPPING ABUTMENTS

(75) Inventors: Stephane Mazet, Rognac (FR); Jean Mondet, Pelissanne (FR); Philippe Antomarchi, Marseilles (FR); Jean-Marc Latorre, Bouc Bel Air (FR)

(73) Assignee: Eurocopter, Marignane (FR)

( * ) Notice: Subject to any disclaimer, the term of this patent is extended or adjusted under 35 U.S.C. 154(b) by 440 days.

(21) Appl. No.: 11/411,135

(22) Filed: Apr. 26, 2006

(65) Prior Publication Data

US 2007/0059175 A1 Mar. 15, 2007

(30) Foreign Application Priority Data

Apr. 27, 2005 (FR) .................................. 05 04230

(51) Int. Cl.
*B64C 27/51* (2006.01)

(52) U.S. Cl. ............................ 416/46; 416/51; 416/53; 416/140

(58) Field of Classification Search .................. 416/46, 416/51, 53, 140, 141, 134 A
See application file for complete search history.

(56) References Cited

U.S. PATENT DOCUMENTS 4,419,051 A 12/1983 DeRosa et al.
5,588,801 A 12/1996 Commelin et al.
5,820,341 A * 10/1998 Mondet et al. ................ 416/46

FOREIGN PATENT DOCUMENTS

| | | |
|---|---|---|
| EP | 0 600 797 | 6/1994 |
| FR | 2 689 483 | 10/1993 |
| FR | 2 725 687 | 4/1996 |
| FR | 2 742 725 | 6/1997 |

* cited by examiner

*Primary Examiner*—Edward Look
*Assistant Examiner*—Dwayne J White
(74) *Attorney, Agent, or Firm*—Young & Thompson

(57) ABSTRACT

A rotorcraft rotor with hinged blades, includes: a hub; a plurality of blades hinged to flap relative to the hub; bottom abutments of the hub, and bottom abutments of the blades suitable for co-operating with the bottom abutments of the hub; and top abutments of the hub, and top abutments of the blades suitable for co-operating with the top abutments of the hub; the top abutments of the hub being movable between a deployed position in which they extend facing the top abutments of the blades, and a retracted position in which they are offset angularly away from the top abutments of the blades. The rotor also includes elements for locking the top abutments of the hub in the deployed position, and inertial means for releasing the top abutments of the hub and for deactivating the locking means.

12 Claims, 3 Drawing Sheets

102
101
103
11
100
102
107
14

ROTOCRAFT ROTOR WITH HINGED BLADES AND LOCKABLE RETRACTABLE FLAPPING ABUTMENTS

The present invention relates to a rotorcraft rotor with hinged blades and to a device for locking retractable flapping abutments, in particular top abutments.

FIELD OF THE INVENTION

The technical field of the invention is that of manufacturing helicopters.

The present invention relates in particular to main propulsion and lift rotors for helicopters, which rotors have blades that are hinged relative to the rotor hub.

BACKGROUND OF THE INVENTION

Numerous helicopter rotors are provided with hinged blades, either on ball bearings or else on elastomer bearings. When stationary, with no centrifugal force urging the blades into a "flat" configuration, it can happen that the blades of such rotors are subjected to excessive vertical movements (flapping), leading to abnormal stresses in the elements of the rotor and possibly damaging them severely. This phenomenon can arise in particular under the following circumstances:

- gusts of wind;
- motion of a ship having the helicopter on board; and
- folding the blades, reversing the static moment of the blades when their centers of gravity lie between the flapping hinge axis and the axis of the rotor.

For these reasons, hinged rotor hubs are generally fitted with low abutments and with high abutments that serve to limit the amplitude of such flapping movements, respectively downwards and upwards.

A particular object of the present invention is to propose an improvement to the rotors described in French patent No. 2 725 687 and U.S. Pat. No. 5,588,801.

Those patents themselves seek to simplify the devices for limiting blade flapping and comprising independent top abutments for each blade; the device described in those patents comprises high abutments projecting from a common ring that is coaxial with the hub; the ring is mounted to turn about a rotor axis on a top portion of the hub; the device comprises flyweights connected to the ring via drive means for turning the ring between a "ground" position in which the high abutments are positioned facing respective portions of the blade in order to be active, and a "flight" position in which the high abutments are retracted out of the range of said portions of the blade; those drive means make use of the centrifugal force applied to the flyweights for retracting the high abutments, and include return springs for returning the ring to the "ground" position; those means oppose each other, with centrifugal force overcoming the return force once the speed of rotation of the rotor exceeds a predetermined value.

The device described in those patents includes an abutment serving to avoid untimely retraction of the ring carrying the blade abutments while on the ground, but for the ring turning in one direction only; if the ring turns in the opposite direction, such untimely retraction becomes possible once sufficient force is applied to overcome the return forces of the springs; although the springs are comfortably dimensioned, it has nevertheless been found that this precaution can be insufficient, particularly prior to a flight, while the pilot is verifying that the servo-controls that act on the rotor blades (the cyclic pitch and the collective pitch) are operating properly.

It has been found that when the floatingly-mounted low-abutment droop-restrainer ring is in a center position, all of the blades have a small amount of freedom to move vertically (through about 1.5°); however, when the low-abutment droop-restrainer ring is off-center, some of the blades can reach their high abutments while the opposite blades reach their low abutments.

If pitch variation is then applied by a servo-control to a blade in the high abutment position, then the displacement of the abutment shoe of the blade will rub against the retractable ring and might turn it sufficiently to completely unlock all of the high abutments in undesired manner.

OBJECTS AND SUMMARY OF THE INVENTION

It is that drawback that the invention seeks to remedy.

Thus, the invention applies in general to a rotorcraft rotor with hinged blades, the rotor comprising: a hub; a plurality of blades hinged to flap relative to the hub; bottom abutments of the hub, and bottom abutments of the blades suitable for co-operating with the bottom abutments of the hub; and top abutments of the hub, and top abutments of the blades suitable for co-operating with the top abutments of the hub; the top abutments of the hub being movable between a deployed position in which they extend facing the top abutments of the blades, and a retracted position in which they are offset angularly away from the top abutments of the blades.

In accordance with the invention, the rotor further comprises locking means for locking the top abutments of the hub in the deployed position to prevent the top abutments of the hub being retracted in untimely manner, and inertial means for releasing the top abutments of the hub and suitable for deactivating the locking means for locking the top abutments of the hub in the deployed position.

Because of the presence of the inertial means for releasing the top abutments of the hub, these abutments cannot move into the retracted configuration as is required for flight, unless the speed of the rotor exceeds a predetermined value.

In a preferred embodiment, the high abutments of the hub are secured to a common pivot ring from the periphery of which they project, as described in French patent No. 2 725 687 and U.S. Pat. No. 5,588,801.

Also preferably, the invention applies to a rotorcraft main rotor fitted with two substantially identical assemblies serving to activate and to deactivate the high abutments of the hub and carried by a common pivot ring; each of the assemblies comprises a moving flyweight (mounted on a pivot link) tending to retract the high abutments from in front of the abutments fitted to the ends of the blades, by the centrifugal effect, and also a spring opposing the centrifugal force due to the flyweight; in a variant, each of the assemblies may include a rack-and-pinion drive system for transmitting the movements of the flyweight to the pivot ring fitted with the high abutments, e.g. as described in the above-mentioned patents.

In a preferred embodiment, the means for locking the high abutments of the hub in the active position (the "ground" position) comprise a locking structure mounted to pivot relative to the hub, where appropriate possibly substantially freely, about a pivot axis that is generally substantially horizontal, extending in a plane that is substantially orthogonal to the axis of rotation of the rotor (and/or the hub), with the center of gravity of the locking structure lying below said pivot axis. The locking means preferably further include a first slot, or groove that is substantially radial provided in a ring that pivots relative to the hub of the rotor about the axis of rotation of the rotor, said ring being fitted with the high abutments of the hub; preferably, the locking means further include a second slot or groove substantially identical to the preceding slot or groove and provided in a portion of the hub that receives the pivot ring, and that is capable of being put into register with the first slot when the pivot ring is in position for activating the high abutments; thus, when the rotor is stationary and said slot(s) is/are in register with said pivoting locking structure, the terrestrial gravitation forces acting on the structure forming a bolt (or finger) can cause it to become engaged in the catch-forming slot(s) so as to lock the ring supporting the high abutments of the hub in the "ground" position.

In this embodiment, when the speed of rotation of the rotor exceeds a predetermined value, the moment relative to the pivot axis of said pivot structure that results from the centrifugal force applied to the pivot structure can exceed the moment in the opposite direction that results from gravity acting on the structure, so as to cause the structure to become disengaged from said slot(s): this structure for locking the high abutments in the "ground" position is thus deactivated by the centrifugal force (or inertia) that results from its mass.

In this embodiment, the means for locking the high abutments of the hub in the active position can be associated with return means, such as a coil spring, acting against the gravitational forces that act on the pivot structure in order to cause a portion of said structure to engage in the locking slot(s).

In another preferred embodiment, the locking means for locking the high abutments of the hub in the active position comprise a structure that is mounted to pivot relative to the hub about an axis that is generally substantially vertical and that extends substantially parallel to the axis of rotation of the rotor.

Under such circumstances, in an advantageous embodiment, the pivot structure can be inserted between the pivot ring fitted with the high abutments and the pivot rods fitted with respective flyweights and return springs, as described in particular in the above-mentioned patents; in this particular configuration, the moving structure for locking the pivot ring preferably includes two pegs or pivots having distinct parallel axes: the structure is mounted to pivot relative to the pivot ring by a first of these two pivots, and it also pivotally receives a rod fitted with a flyweight and a spring via the second of these two pivots.

In this embodiment, the locking pivot structure preferably further includes a radial projection (preferably at each of its two pivot axes) or nose that is designed to engage with (or in) an indentation provided in a part secured to the hub and extending facing the pivot ring that is fitted with the high abutments, so as to prevent the ring from moving relative to the hub in a position for activating the high abutments.

Under such circumstances, deactivating these locking means can result in the centrifugal force acting on the rod via the flyweight causing the pivot structure to turn about at least one of its two pivot axes, prior to causing the ring to turn as described in the above-mentioned patents.

BRIEF DESCRIPTION OF THE DRAWINGS

Other characteristics and advantages of the invention appear from the following description which refers to the accompanying drawings and which shows preferred embodiments of the invention, without being limiting in any way.

FIG. 1 is a diametral section view showing the invention applied to a high abutment device having a common rotary ring similar to those described in the above-mentioned patents: this figure is in section on I-I of FIG. 2 which is a plan view of the device.

FIG. 3 is a side view that shows a finger that pivots about a horizontal axis and that serves to hold a pivot ring carrying the abutments of the hub in an active position, while FIG. 4 is a view looking along arrow IV of FIG. 3, constituting a face view of the device.

MORE DETAILED DESCRIPTION

Figure 1:
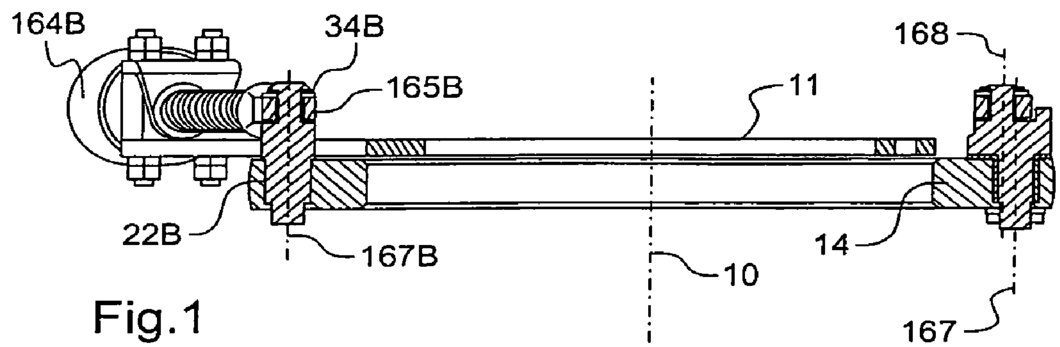
FIGS. 1 and 2 show a first embodiment of the invention.
Figure 2:
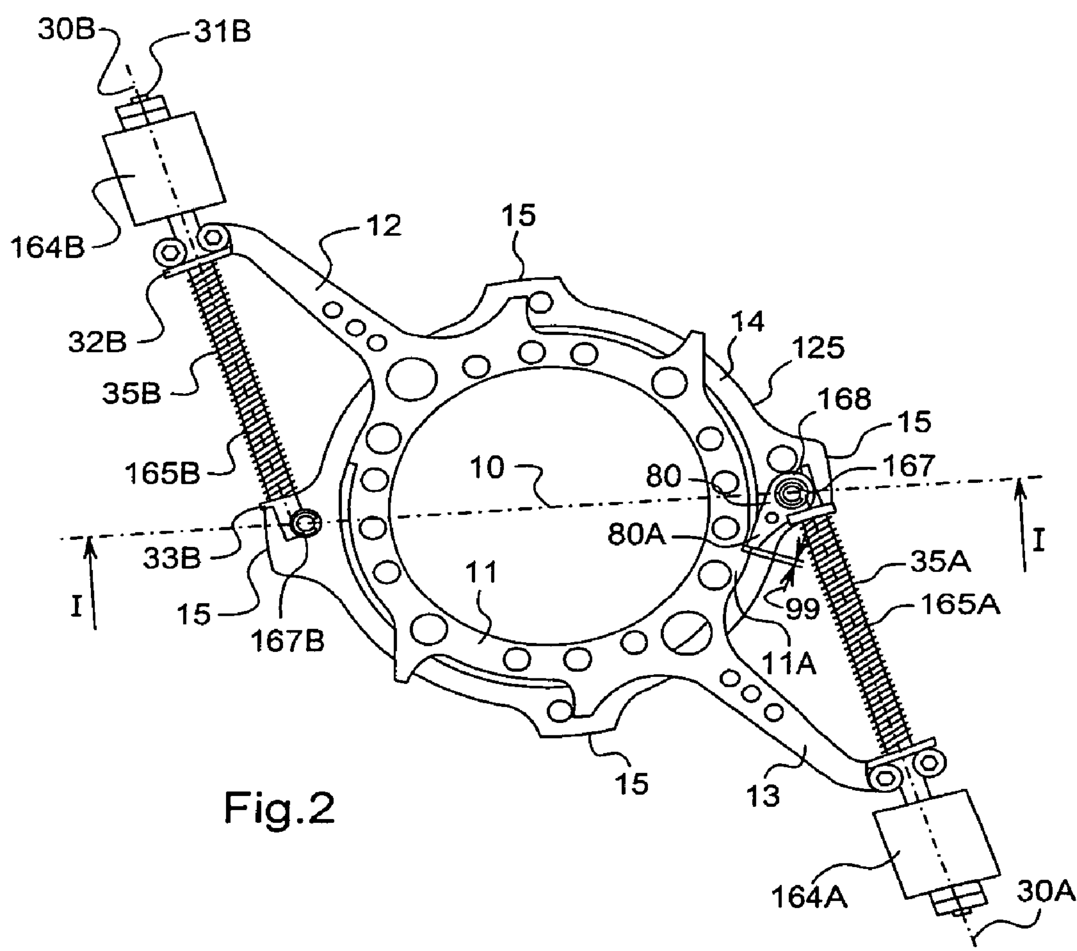
Figure 6:
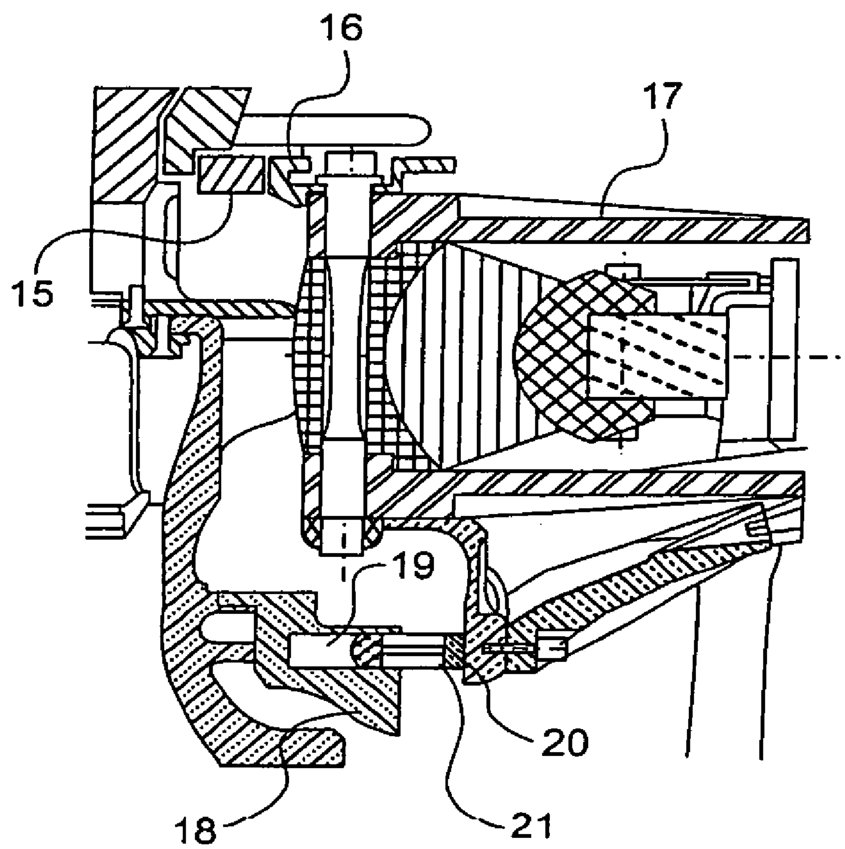
FIG. 6 is half-section view on a diametral plane showing the high and low flapping abutments fitted to a hinged blade and a hub receiving the blade.

With reference to FIGS. 1, 2, and 6, a rotor of axis 10 comprises a plurality of parts secured to the rotor hub; one of these parts (cf. FIGS. 1 and 2) is in the form of a circular flange 11 extended by two diametrically opposite arms 12 and 13; under this flange, and at its periphery, there is provided a ring 14 that is mounted to pivot about the axis 10; this ring is adapted to a rotor having four blades hinged relative to the hub; the ring 14 thus has four peripheral projections 15 suitable for serving as abutments each serving to limit the upward flapping angle of a respective one of the blades by coming into contact with a top bearing zone (or shoe) 16 at an end 17 of the blade (cf. FIG. 6); in its bottom portion, the rotor hub has a part 18 in which there is formed a groove 19 receiving a second ring 21—referred to as a drop restrainer ring—; this ring is floatingly mounted (with radial clearance) in the groove 19; the outside face of this second ring serves as a flapping low abutment, by coming into contact with a bottom bearing zone (or shoe) 20 at the end 17 of the blade.

As in the above-mentioned patents, two flyweight-and-spring assemblies connect the ring 14 carrying the abutments 15 to the part 11, 12, and 13 secured to the hub, and serve to cause said ring to pivot about the axis 10 relative to the hub in order to activate or on the contrary deactivate the abutments 15; one of these assemblies, given reference "B" comprises a peg 22B of axis 167B parallel to the axis 10, which peg is secured to the ring 14 via one of its projections 15; the top end of the peg forms a pivot pin 34B about the axis 167B for a rod 165B having a longitudinal axis 30B; in the vicinity of the distal end 31B of the rod 165B, there is provided a flyweight 164B of cylindrical shape which is secured to the rod; the distal end of the arm 12 is fitted with a sliding bearing 32B for the rod 165B; this bearing is secured to the arm 12 by screws; the rod 165B is fitted with a flange 33B in the vicinity of its end that pivots on the pin 34B of the peg 22B.

A coil spring 35B finishes off this assembly; the spring surrounds a fraction of the rod 165B and has a first of its two ends bearing against the flange 33B, while its second end bears against the sliding bearing 32B.

This spring works in compression, urging the bearing 32B away from the flange 33B, thereby causing the ring 14 to turn about the axis 10 in the counterclockwise direction, while the rotor is stationary or is rotating slowly; when the speed of the rotor exceeds a predetermined value, the centrifugal force urging the flyweight 164B away from the axis 10 is sufficient to compress the spring 35B and cause the ring 14 to turn about the axis 10 in the clockwise direction, thereby retracting the high abutments 15 and offsetting them angularly from the abutment shoes 16 fitted to the inside ends of the blades of the rotor.

In accordance with the invention, a second flyweight-and-spring assembly "A" is situated to the right of FIG. 2 and additionally includes means for locking the ring 14 in the position for activating the high abutments 15, and also means for deactivating these locking means.

Figure 5:
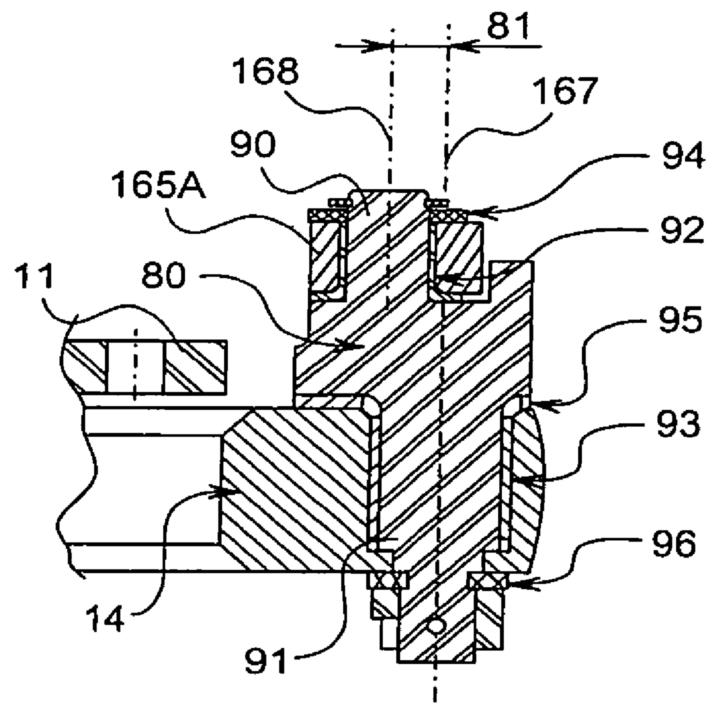
FIG. 5 is a section view on a larger scale of a locking pivot structure fitted to the device of FIGS. 1 and 2.

Compared with the above-described assembly "B", the proximal end of the pivot link or rod 165A in the assembly A is not pivotally mounted about a simple peg centered on an axis secured to the ring 14, instead the link pivots about an axis 168 of a cam-shaped finger 80; the finger 80 is mounted to pivot about a (stationary) axis 167 relative to the ring 14, with the two axes 167 and 168 being parallel to the axis 10 and offset by a distance 81 (FIG. 5).

Under the effect of the centrifugal force acting on the flyweight 164A, the link 165A causes the finger 80 to pivot about the axis 167, having a first effect of disengaging the projection 80A of the pivot finger 80 from the indentation 11A provided at the periphery of the flange 11, thus enabling the ring 14 to be unlocked and allowing it to turn about the axis 10.

On continuing to exert traction on the axis 168, and via the finger 80 on the axis 167, the link 165A has a second effect of turning the ring 14 clockwise, and consequently disengaging the abutments 15 from the range of the high abutments of the blade (change to the "flight" position).

In order to avoid any risk of static indeterminacy that might lead to untimely jamming, it is preferable to use only one finger 80, even when there are two or more flyweight-and-spring assemblies "A" and "B". The configuration thus remains unchanged for the other flyweight-and-spring assemblies (in a type B configuration).

In order to ensure that the device operates correctly, it is necessary for the finger 80 to pivot about the axis 167 before the ring 14 begins to turn about the axis 10; otherwise, the force exerted by the end 80A of the finger 80 on the indentation or notch 11A will prevent the finger 80 from escaping from the notch 11A.

For this purpose, and as described in detail below, friction at the pivots of the finger 80 is reduced to as little as possible; the springs 35A and 35B are preferably also stressed in slightly differing manner; and finally, clearance 99 is provided between the projection 80A and the notch 11A, when they are in their mutually-engaged position corresponding to a ground configuration:

a) Reducing interfering friction in the locking finger:

The friction in the connections between the top pivot 90 of the finger 80 and the link 165A, and also between the bottom pivot 91 of the finger 80 and the ring 14, is reduced to as little as possible by using bushings or washers made of materials having low coefficients of friction: "DU" bushings 92 and 93 of sintered materials and washers 94 to 96 of bronze (cf. FIG. 5).

b) Differential precompression of the springs 35A and 35B:

In the assembly shown in FIGS. 1 and 2, the precompression applied to the spring 35A of the assembly A (i.e. the prestress in compression) is less than that applied to the spring 35B of the assembly B. This difference can be achieved:

- by introducing an offset between the axes 167 and 168, while keeping the other parts of the assemblies "A" and "B" identical, so that the spring 35A is compressed to a smaller extent than the spring 35B; and/or
- by interposing a spacer between one end of the spring 35B and the part against which said end bears, thereby reducing the length of the spring.

At rest, the rod 165A is subjected to the precompression KA of the spring 35A of the assembly A, urging the finger 80 into the locked position and holding the ring 14 in the "ground" position.

Similarly, the rod 165B is subjected to the precompression force KB of the spring 35B of the assembly B, also contributing to holding the ring 14 in the "ground" position.

When the speed of rotation of the rotor increases, the centrifugal force applied to each flyweight 164A, 164B increases.

At some particular speed of rotation, the centrifugal force overcomes the force KA and the friction against the finger of the assembly A, while remaining less than the force KB on the assembly B. The finger 80 then begins to turn about the axis 167 and unlocks the ring 14, while the resultant forces acting on the assembly B continue to oppose turning of the ring.

Thereafter, at a greater speed of rotation, when the centrifugal force reaches a value that is sufficient to overcome both springs and the friction in the ring/support connections, the ring 14 begins to turn.

c) Clearance between the finger 80 and the support flange 11:

Providing clearance 99 (FIG. 2) between the projection 80A of the finger 80 and the stop notch 11A formed in the support 11 provides additional operating safety:

- on passing to the "flight" position, the ring 14 can begin turning without preventing the finger from pivoting; and
- on passing to the "ground" position, the clearance makes it possible to ensure that the finger returns to the locked position.

Figure 3:
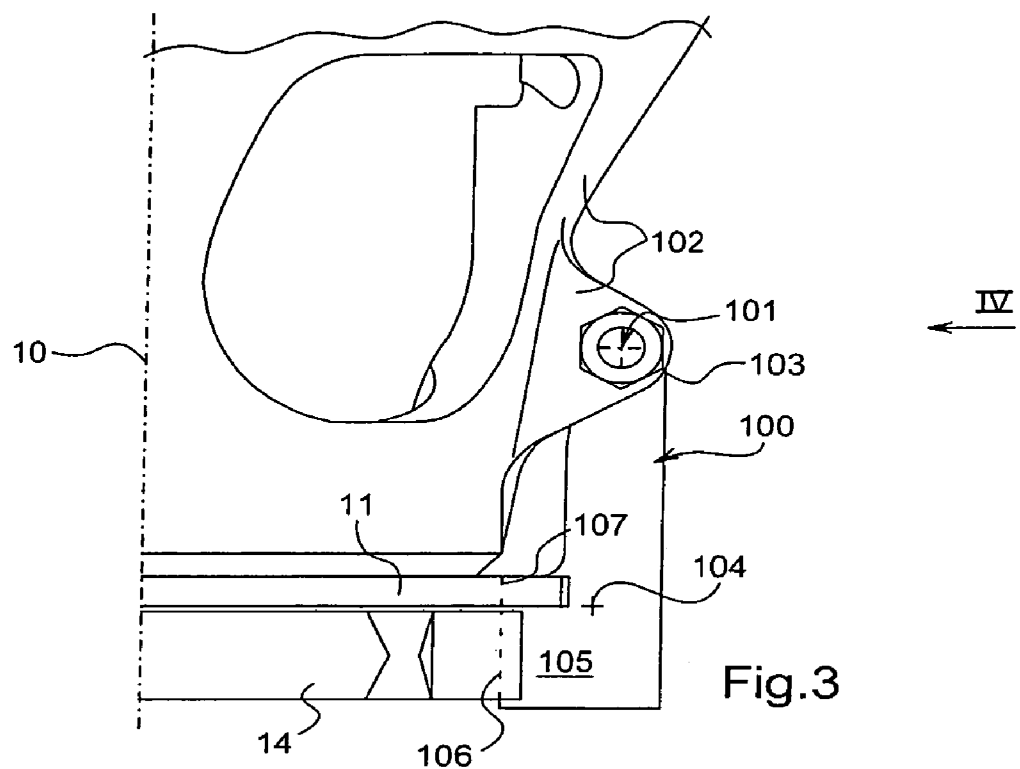
FIGS. 3 and 4 are diagrammatic views on a larger scale showing a second embodiment of the invention.
Figure 4:
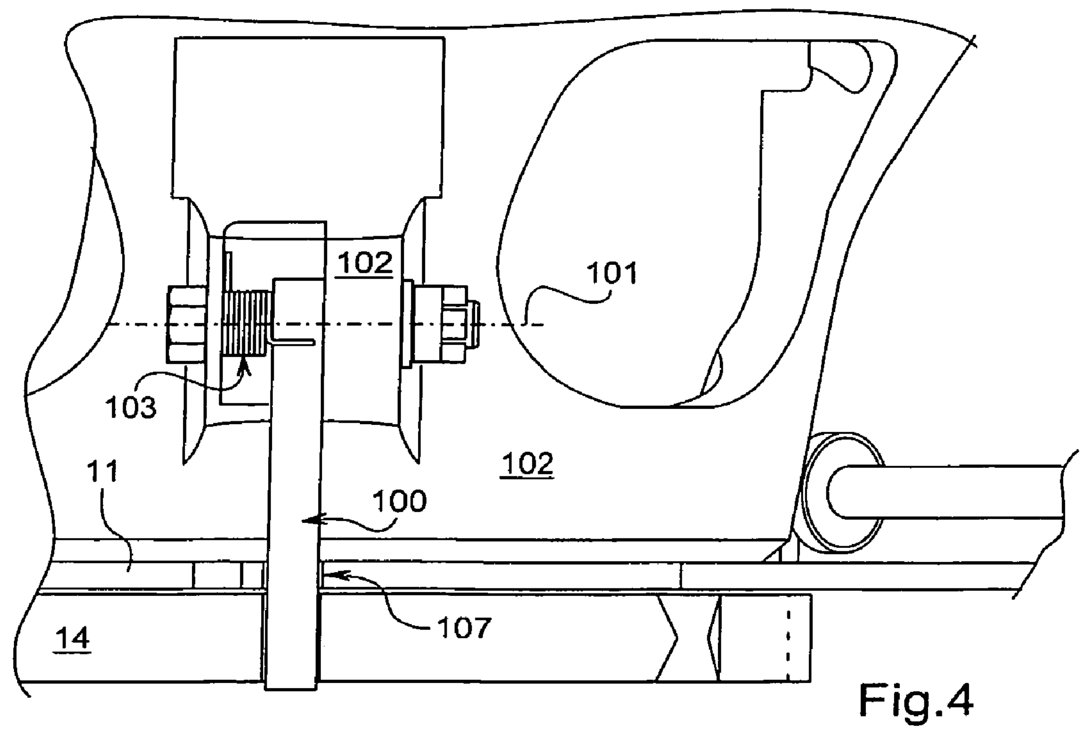

FIGS. 3 and 4 show a preferred embodiment of a locking finger 100 mounted to pivot about a horizontal axis 101.

The finger 100 is mounted to pivot about the axis 101 which is orthogonal to the axis 10; the finger 100 is suspended by a pivot (in the form of a bolt) having a fork secured to the support 102 of the cap, which is itself secured to the top of the support 11.

As soon as the centrifugal force acting on the finger manages to overcome the force exerted by a return spring 103, the finger pivots about its axis (to the right in FIG. 3), with its center of gravity 104 that is situated under the axis 101 moving away from the axis 10; the base 105 of the finger moves out of the notch 106 provided in the periphery of the ring 14, thereby releasing the ring to turn.

In order to ensure that this finger works in shear rather than in bending, it is preferable to provide a notch 107 in the support 11 that is disposed facing the finger 100. When the finger is engaged in the notches 106 and 107, any turning force on the ring 14 will lead to shear forces in the finger 100, the ring 14, and the support 11.

In order to operate without any risk of jamming, this variant also requires functional clearances, and in particular:

- between the finger and the notch 106 formed in the ring 14:
- between the finger and the notch 107 formed in the support 11; and
- between the finger and its pivot axis, so as to avoid unwanted bending in the finger and the axis.

In the embodiment shown in FIGS. 3 and 4, unlike the embodiment of FIGS. 1, 2, and 5, the function of locking the ring 14 is independent of the function of turning the ring, since the locking finger is actuated directly by the centrifugal force acting thereon (and no longer via the rod 165A).

In a manner similar to the first-described embodiment, it is necessary in this second embodiment to make provision for the various springs to have appropriate stiffnesses. This ensures unlocking takes place by the finger 100 moving away before the ring 14 starts turning.

What is claimed is:

1. A rotorcraft rotor with hinged blades, the rotor comprising: a hub; a plurality of blades hinged to flap relative to the hub; bottom abutments (21) of the hub, and bottom abutments (20) of the blades suitable for co-operating with the bottom abutments of the hub; and top abutments (15) of the hub, and top abutments (16) of the blades suitable for co-operating with the top abutments of the hub; the top abutments of the hub being movable between a deployed position in which they extend facing the top abutments of the blades, and a retracted position in which they are offset angularly away from the top abutments of the blades, the rotor further comprising locking means for locking the top abutments (15) of the hub in the deployed position to prevent the top abutments of the hub being retracted in untimely manner, and inertial means for releasing the top abutments of the hub and suitable for deactivating the locking means for locking the top abutments of the hub in the deployed position.

2. A rotor according to claim 1, in which the top abutments of the hub are secured to a common pivot ring (14) mounted to pivot about the axis (10) of the hub, said abutments projecting from the periphery of said ring.

3. A rotor according to claim 1, in which the locking means for locking the top abutments in the active position comprise a locking structure (80, 100) mounted to pivot relative to the hub.

4. A rotor according to claim 3, in which the locking structure (80) is mounted to pivot about an axis (167) that is substantially parallel to the axis (10) of the hub.

5. A rotor according to claim 3, in which the structure (100) is mounted to pivot about an axis (101) substantially perpendicular to the axis (10) of the hub.

6. A rotor according to claim 5, in which the locking means further include a first slot or groove (106) that is substantially radial and that is provided in a pivot ring (14) that is pivotable relative to the rotor hub about the axis (10) of rotation of the rotor, said ring being fitted with the high abutments (15) of the hub.

7. A rotor according to claim 6, in which the locking means further include a second slot or groove (107) substantially identical to the first slot (106), provided in a portion (11) of the hub that receives the pivot ring, and that is capable of being put into register with the first slot (106) when the pivot ring is in its position in which the high abutments of the hub are active.

8. A rotor according to claim 6, in which the locking means for locking the high abutments of the hub in the active position include return means such as a coil spring (103) that acts against the gravity forces acting on the pivot structure in order to cause a portion of said structure to become engaged in the locking slot.

9. A rotor according to claim 4, in which the moving structure (80) for locking the pivot ring includes two pegs or pivots having axes (167, 168) that are parallel and distinct, said structure being pivotally mounted via a first of said two pivots relative to a pivot ring (14), the pivot ring being pivotable relative to the rotor hub about the axis (10) of rotation of the rotor, the moving structure pivotally receiving via a second of said two pivots a rod (165A) fitted with a flyweight (164A) and a spring (35A).

10. A rotor according to claim 4, in which the locking pivot structure (80) includes a radial projection (80A) or nose designed to engage in an indentation (11A) provided in a part (11) that is secured to the hub and that extends facing a pivot ring (14) fitted with the high abutments (15), the pivot ring being pivotable relative to the rotor hub about the axis (10) of rotation of the rotor, so as to lock the ring relative to the hub in a position in which the high abutments are active.

11. A rotor according to claim 2, having two assemblies serving to activate and deactivate the high abutments (15) of the hub carried by the common pivot ring (14), each of these assemblies having a respective moving flyweight (164A, 164B) mounted on a pivot link (165A, 165B) and tending to retract the high abutments from facing the abutments fitted to the ends of the blades by means of the centrifugal effect, and also a spring (35A, 35B) opposing the centrifugal force due to the flyweights.

12. A rotor according to claim 2, having two assemblies for driving the ring (14) inertially, each of the assemblies comprising a rack-and-pinion drive system for transmitting the movement of the flyweight to the pivot ring fitted with the high abutments.

* * * * *